United States Patent
Lyons et al.

(10) Patent No.: US 6,774,164 B2
(45) Date of Patent: Aug. 10, 2004

(54) PROCESS FOR PRODUCING FLUOROELASTOMERS WITH FLUORINATED ANIONIC SURFACTANTS

(75) Inventors: Donald Frederick Lyons, Wilmington, DE (US); Albert Lloyd Moore, Wilmington, DE (US); Phan Linh Tang, West Chester, PA (US)

(73) Assignee: DuPont Dow Elastomers L.L.C., Wilmington, DE (US)

( * ) Notice: Subject to any disclaimer, the term of this patent is extended or adjusted under 35 U.S.C. 154(b) by 176 days.

(21) Appl. No.: 09/938,695

(22) Filed: Aug. 24, 2001

(65) Prior Publication Data

US 2002/0037985 A1 Mar. 28, 2002

Related U.S. Application Data

(60) Provisional application No. 60/234,597, filed on Sep. 22, 2000.

(51) Int. Cl.$^7$ ............................................. C08F 214/18
(52) U.S. Cl. ..................... 524/157; 524/166; 524/423; 524/462; 524/544; 524/545; 524/546; 524/805; 525/326.2; 525/344; 526/225; 526/242; 526/250; 526/255
(58) Field of Search ................................ 524/423, 462, 524/544, 166, 157, 463, 545, 546, 805; 525/326.2, 344; 526/242, 250, 206, 225, 255

(56) References Cited

U.S. PATENT DOCUMENTS

| | | | |
|---|---|---|---|
| 4,025,709 A | | 5/1977 | Blaise et al. |
| 4,380,618 A | | 4/1983 | Khan et al. |
| 4,381,384 A | | 4/1983 | Khan |
| 4,524,197 A | * | 6/1985 | Khan .......................... 526/206 |
| 5,688,884 A | | 11/1997 | Baker et al. |
| 5,789,508 A | | 8/1998 | Baker et al. |

FOREIGN PATENT DOCUMENTS

| | | | |
|---|---|---|---|
| WO | WO 9708214 | 3/1997 | |
| WO | WO 9955746 | 11/1999 | |
| WO | WO 9955746 A1 * | 11/1999 | ........... C08F/14/22 |

OTHER PUBLICATIONS

Zonyl® FS–62 Fluorosurfactant, DuPont Speclalty Chemicals, Technical Bulletin H–70044, Feb. 1998.

Zonyl® TBS Fluorosurfactant, DuPont Specialty Chemicals, Technical Bulletin H–49019, Mar. 1998.

* cited by examiner

*Primary Examiner*—Kelechi C. Egwim

(57) ABSTRACT

A novel emulsion polymerization process for the production of fluoroelastomers is disclosed wherein a partially fluorinated anionic surfactant of the formula $F-(CF_2CF_2)_n-CH_2CH_2SO_3M$, where n is an integer from 2 to 9, or mixtures thereof, and M is a cation having a valence of 1, is used as the dispersing agent.

16 Claims, No Drawings

PROCESS FOR PRODUCING FLUOROELASTOMERS WITH FLUORINATED ANIONIC SURFACTANTS

CROSS-REFERENCE TO RELATED APPLICATIONS

This application claims the benefit of U.S. Provisional Application No. 60/234,597 filed Sep. 22, 2000.

FIELD OF THE INVENTION

This invention pertains to a novel emulsion polymerization process for the production of fluoroelastomers wherein a certain class of partially fluorinated anionic surfactants is used as the dispersing agent.

BACKGROUND OF THE INVENTION

Fluoroelastomers having excellent heat resistance, oil resistance, and chemical resistance have been used widely for sealing materials, containers and hoses.

Production of such fluoroelastomers by emulsion and solution polymerization methods is well known in the art; see for example U.S. Pat. Nos. 4,214,060 and 4,281,092. Generally, fluoroelastomers are produced in an emulsion polymerization process wherein a water-soluble polymerization initiator and a relatively large amount of surfactant are employed. The surfactant most often used for such processes has been ammonium perfluorooctanoate (C-8). The resulting fluoroelastomer leaves the reactor in the form of a dispersion.

While C-8 works very well as a surfactant in the polymerization process, it is relatively expensive, and its future commercial availability is uncertain. Thus, it would be desirable to find other surfactants for use in the emulsion polymerization of fluoroelastomers.

Khan (U.S. Pat. No. 4,524,197) discloses an emulsion polymerization process for manufacturing fluoroelastomers. The process employs a surfactant of the formula $F-(CF_2CF_2)_nCH_2CH_2-OSO_3M$, where n is an integer from 2–8 or mixtures thereof, and M is an alkali metal cation, hydrogen ion or ammonium ion. This surfactant has several disadvantages vs. C-8. First of all, the Khan surfactant acts as a chain transfer agent due to the active hydrogen atoms adjacent to the —OSO3-group, thus limiting the molecular weight of the fluoroelastomer. In addition, it is difficult to remove residual amounts of this surfactant from the resulting fluoroelastomer. Residual surfactant may interfere with vulcanization of the elastomer with such commonly employed curatives as bisphenols.

Khan and Morgan (U.S. Pat. No. 4,380,618) disclose an emulsion polymerization process for manufacturing crystalline thermoplastic tetrafluoroethylene homopolymers and copolymers. The process employs a surfactant of the formula $F-(CF_2CF_2)_nCH_2CH_2-SO_3M$, where n is an integer from 2–8, or mixtures thereof, and M is an alkali metal cation, hydrogen ion or ammonium ion. The crystalline fluoropolymers produced in Khan and Morgan do not absorb surfactant to any substantial degree. In contrast, because fluoroelastomers are amorphous, rather than crystalline, it would be expected that this surfactant would be absorbed into fluoroelastomer polymer particles and thus be i) less effective in the polymerization of fluoroelastomers due to chain transfer limiting elastomer molecular weight and ii) difficult to wash out of any fluoroelastomer produced, thus adversely effecting vulcanization.

Blaise and Grimaud (U.S. Pat. No. 4,025,709) disclose a similar process for the production of crystalline thermoplastic vinylidene fluoride homopolymers and copolymers. The process employs a surfactant of the formula $R_f-CH_2CH_2-SO_3M$, where $R_f$ is a perfluorinated radical having 4 to 10 carbon atoms and M is an alkali metal cation, or ammonium ion. As in Khan and Morgan, the crystalline fluoropolymers produced in Blaise and Grimaud do not absorb surfactant to the same degree that an amorphous fluoroelastomer would when made in a process employing the above surfactant. Thus this surfactant would be expected to exhibit the same deficiencies as the surfactants disclosed in U.S. Pat. No. 4,380,618 when employed in a polymerization process for making fluoroelastomers.

Baker and Zipfel (U.S. Pat. Nos. 5,789,508 and 5,688,884) disclose that the polymerization process of Khan and Morgan for crystalline thermoplastic tetrafluoroethylene homopolymers and copolymers is improved when the surfactant employed is a particular species of the genus used by Khan and Morgan. The preferred surfactant is of the formula $C_6F_{13}CH_2CH_2SO_3M$ wherein M is a cation having a valence of 1. The latter is less toxic than other species of the genus. For the same reasons as mentioned in the discussion of Khan and Morgan patent above, one skilled in the art would not predict that the Baker and Zipfel surfactant would be satisfactory in a process for making fluoroelastomers.

SUMMARY OF THE INVENTION

One aspect of the present invention provides an emulsion polymerization process for the production of fluoroelastomers comprising:

(A) charging a reactor with a quantity of an aqueous solution comprising a surfactant of the formula $F-(CF_2CF_2)_n-CH_2CH_2SO_3M$ where n is an integer from 2 to 9, or mixtures thereof, and M is a cation having a valence of 1;

(B) charging the reactor with a quantity of a monomer mixture to form a reaction medium, said monomer mixture comprising i) from 25 to 70 weight percent, based on total weight of the monomer mixture, of a first monomer, said first monomer selected from the group consisting of vinylidene fluoride and tetrafluoroethylene, and ii) between 75 and 30 weight percent, based on total weight of the monomer mixture, of one or more additional copolymerizable monomers, different from said first monomer, wherein said additional monomer is selected from the group consisting of fluorine-containing olefins, fluorine-containing vinyl ethers, hydrocarbon olefins and mixtures thereof; and (C) polymerizing said monomers in the presence of a free radical initiator to form a fluoroelastomer dispersion while maintaining said reaction medium at a pH between 1 and 7, at a pressure between 0.5 and 10 MPa, and at a temperature between 25° C. and 130° C.

Another aspect of the present invention is a curable fluoroelastomer prepared by the process of this invention.

DETAILED DESCRIPTION OF THE INVENTION

The present invention is directed to an emulsion polymerization process for producing a fluoroelastomer. By "fluoroelastomer" is meant an amorphous elastomeric fluoropolymer. The fluoropolymer may be partially fluorinated or perfluorinated. Fluoroelastomers made by the process of this invention contain between 25 to 70 weight percent, based on the weight of the fluoroelastomer, of copolymerized units of a first monomer which may be vinylidene fluoride ($VF_2$) or tetrafluoroethylene (TFE). The remaining units in the fluoroelastomers are comprised of one or more additional copolymerized monomers, different from said first monomer, selected from the group consisting of fluorine-containing olefins, fluorine-containing vinyl ethers, hydrocarbon olefins and mixtures thereof.

According to the present invention, fluorine-containing olefins copolymerizable with the first monomer include, but are not limited to, vinylidine fluoride, hexafluoropropylene (HFP), tetrafluoroethylene (TFE), 1,2,3,3,3-pentafluoropropene (1-HPFP), chlorotrifluoroethylene (CTFE) and vinyl fluoride.

The fluorine-containing vinyl ethers employed in the present invention include, but are not limited to perfluoro (alkyl vinyl) ethers. Perfluoro(alkyl vinyl) ethers (PAVE) suitable for use as monomers include those of the formula $$CF_2=CFO(R_fO)_n(R_{f'}O)_mR_f \qquad (I)$$

where $R_f$ and $R_{f'}$ are different linear or branched perfluoroalkylene groups of 2–6 carbon atoms, m and n are independently 0–10, and $R_f$ is a perfluoroalkyl group of 1–6 carbon atoms.

A preferred class of perfluoro(alkyl vinyl) ethers includes compositions of the formula $$CF_2=CFO(CF_2CFXO)_nR_f \qquad (II)$$

where X is F or $CF_3$, n is 0–5, and $R_f$ is a perfluoroalkyl group of 1–6 carbon atoms.
A most preferred class of perfluoro(alkyl vinyl) ethers includes those ethers wherein n is 0 or 1 and $R_f$ contains 1–3 carbon atoms. Examples of such perfluorinated ethers include perfluoro(methyl vinyl) ether (PMVE) and perfluoro (propyl vinyl) ether (PPVE). Other useful monomers include compounds of the formula $$CF_2=CFO[(CF_2)_mCF_2CFZO]_nR_f \qquad (III)$$

where $R_f$ is a perfluoroalkyl group having 1–6 carbon atoms, m=0 or 1, n=0–5, and Z=F or $CF_3$.
Preferred members of this class are those in which $R_f$ is $C_3F_7$, m=0, and n=1.

Additional perfluoro(alkyl vinyl) ether monomers include compounds of the formula $$CF_2=CFO[(CF_2CF\{CF_3\}O)_n(CF_2CF_2CF_2O)_m(CF_2)_p]C_xF_{2x+1} \qquad (IV)$$

where m and n independently=0–10, p=0–3, and x=1–5.
Preferred members of this class include compounds where n=0–1, m=0–1, and x=1.

Other examples of useful perfluoro(alkyl vinyl ethers) include $$CF_2=CFOCF_2CF(CF_3)O(CF_2O)_mC_nF_{2n+1} \qquad (V)$$

where n=1–5, m=1–3, and where, preferably, n=1.

If copolymerized units of PAVE are present in fluoroelastomers prepared by the process of the invention, the PAVE content generally ranges from 25 to 75 weight percent, based on the total weight of the fluoroelastomer. If perfluoro (methyl vinyl) ether is used, then the fluoroelastomer preferably contains between 30 and 55 wt. % copolymerized PMVE units.

Hydrocarbon olefins useful in the fluoroelastomers prepared by the process of this invention include, but are not limited to ethylene and propylene. If copolymerized units of a hydrocarbon olefin are present in the fluoroelastomers prepared by the process of this invention, hydrocarbon olefin content is generally 4 to 30 weight percent.

The fluoroelastomers prepared by the process of the present invention may also, optionally, comprise units of one or more cure site monomers. Examples of suitable cure site monomers include, but are not limited to: i) bromine-containing olefins; ii) iodine-containing olefins; iii) bromine-containing vinyl ethers; iv) iodine-containing vinyl ethers; v) fluorine-containing olefins having a nitrile group; vi) fluorine-containing vinyl ethers having a nitrile group; vii) 1,1,3,3,3-pentafluoropropene (2-HPFP); viii) perfluoro (2-phenoxypropyl vinyl) ether; and ix) non-conjugated dienes.

Brominated cure site monomers may contain other halogens, preferably fluorine. Examples of brominated olefin cure site monomers are $CF_2=CFOCF_2CF_2CF_2OCF_2CF_2Br$; bromotrifluoroethylene; 4-bromo-3,3,4,4-tetrafluorobutene-1 (BTFB); and others such as vinyl bromide, 1-bromo-2,2-difluoroethylene; perfluoroallyl bromide; 4-bromo-1,1,2-trifluorobutene-1; 4-bromo-1,1,3,3,4,4,-hexafluorobutene; 4-bromo-3-chloro-1,1,3,4,4-pentafluorobutene; 6-bromo-5,5,6,6-tetrafluorohexene; 4-bromoperfluorobutene-1 and 3,3-difluoroallyl bromide. Brominated vinyl ether cure site monomers useful in the invention include 2-bromoperfluoroethyl perfluorovinyl ether and fluorinated compounds of the class $CF_2Br-R_f-O-CF=CF_2$ ($R_f$ is a perfluoroalkylene group), such as $CF_2BrCF_2O-CF=CF_2$, and fluorovinyl ethers of the class $ROCF=CFBr$ or $ROCBr=CF_2$ (where R is a lower alkyl group or fluoroalkyl group) such as $CH_3OCF=CFBr$ or $CF_3CH_2OCF=CFBr$.

Suitable iodinated cure site monomers include iodinated olefins of the formula: $CHR=CH-Z-CH_2CHR-I$, wherein R is $-H$ or $-CH_3$; Z is a $C_1-C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF=CF_2$ and $ICH_2CF_2O[CF(CF_3)CF_2O]_n CF=CF_2$, and the like, wherein n=1–3, such as disclosed in U.S. Pat. No. 5,717,036. In addition, suitable iodinated cure site monomers including iodoethylene, 4-iodo-3,3,4,4-tetrafluorobutene-1 (ITFB); 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,2,2-tetrafluoroethylene; 1,1,2,3,3,3-hexafluoro-2-iodo-1-(perfluorovinyloxy)propane; 2-iodoethyl vinyl ether; 3,3,4,5,5,5-hexafluoro-4-iodopentene; and iodotrifluoroethylene are disclosed in U.S. Pat. No. 4,694,045. Allyl iodide and 2-iodoperfluoroethyl perfluorovinyl ether are also useful cure site monomers.

Useful nitrile-containing cure site monomers include those of the formulas shown below.

$$CF_2=CF-O(CF_2)_n-CN \qquad (VI)$$

where n=2–12, preferably 2–6;

$$CF_2=CF-O[CF_2-CF(CF_3)-O]_n-CF_2-CF(CF_3)-CN \qquad (VII)$$

where n=0–4, preferably 0–2;

$$CF_2=CF-[OCF_2CF(CF_3)]_x-O-(CF_2)_n-CN \qquad (VIII)$$

where x=1–2, and n=1–4; and $$CF_2=CF-O-(CF_2)_n-O-CF(CF_3)CN \qquad (IX)$$

where n=2–4.
Those of formula (VIII) are preferred. Especially preferred cure site monomers are perfluorinated polyethers having a nitrile group and a trifluorovinyl ether group. A most preferred cure site monomer is

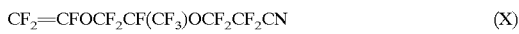 (X)

i.e. perfluoro(8-cyano-5-methyl-3,6-dioxa-1-octene) or 8-CNVE.

Examples of non-conjugated diene cure site monomers include, but are not limited to 1,4-pentadiene; 1,5-hexadiene; 1,7-octadiene; 3,3,4,4-tetrafluoro-1,5-hexadiene; and others, such as those disclosed in Canadian Pat. 2,067,891 and European Pat. 0784064A1. A suitable triene is 8-methyl-4-ethylidene-1,7-octadiene.

Of the cure site monomers listed above, preferred compounds, for situations wherein the fluoroelastomer will be cured with peroxide, include 4-bromo-3,3,4,4-tetrafluorobutene-1 (BTFB); 4-iodo-3,3,4,4-tetrafluorobutene-1 (ITFB); allyl iodide; bromotrifluoroethylene and 8-CNVE. When the fluoroelastomer will be cured with a polyol, 2-HPFP or perfluoro(2-phenoxypropyl vinyl) ether is the preferred cure site monomer. When the fluoroelastomer will be cured with a tetraamine, bis (aminophenol) or bis(thioaminophenol), 8-CNVE is the preferred cure site monomer.

Units of cure site monomer, when present in the fluoroelastomers manufactured by the process of this invention, are typically present at a level of 0.05–10 wt. % (based on the total weight of fluoroelastomer), preferably 0.05–5 wt. % and most preferably between 0.05 and 3 wt. %.

Specific fluoroelastomers which may be produced by the process of this invention include, but are not limited to those comprising copolymerized units of i) vinylidene fluoride and hexafluoropropylene; ii) vinylidene fluoride, hexafluoropropylene and tetrafluoroethylene; iii) vinylidene fluoride, hexafluoropropylene, tetrafluoroethylene and 4-bromo-3,3,4,4-tetrafluorobutene-1; iv) vinylidene fluoride, hexafluoropropylene, tetrafluoroethylene and 4-iodo-3,3,4,4-tetrafluorobutene-1; v) vinylidene fluoride, perfluoro(methyl vinyl) ether, tetrafluoroethylene and 4-bromo-3,3,4,4-tetrafluorobutene-1; vi) vinylidene fluoride, perfluoro(methyl vinyl) ether, tetrafluoroethylene and 4-iodo-3,3,4,4-tetrafluorobutene-1; vii) vinylidene fluoride, perfluoro(methyl vinyl) ether, tetrafluoroethylene and 1,1,3,3,3-pentafluoropropene; viii) tetrafluoroethylene, perfluoro(methyl vinyl) ether and ethylene; ix) tetrafluoroethylene, perfluoro(methyl vinyl) ether, ethylene and 4-bromo-3,3,4,4-tetrafluorobutene-1; x) tetrafluoroethylene, perfluoro(methyl vinyl) ether, ethylene and 4-iodo-3,3,4,4-tetrafluorobutene-1; xi) tetrafluoroethylene, propylene and vinylidene fluoride; xii) tetrafluoroethylene and perfluoro(methyl vinyl) ether; xiii) tetrafluoroethylene, perfluoro(methyl vinyl) ether and perfluoro(8-cyano-5-methyl-3,6-dioxa-1-octene); xiv) tetrafluoroethylene, perfluoro(methyl vinyl) ether and 4-bromo-3,3,4,4-tetrafluorobutene-1; xv) tetrafluoroethylene, perfluoro(methyl vinyl) ether and 4-iodo-3,3,4,4-tetrafluorobutene-1; and xvi) tetrafluoroethylene, perfluoro(methyl vinyl) ether and perfluoro(2-phenoxypropyl vinyl) ether.

Additionally, iodine-containing endgroups, bromine-containing endgroups or mixtures thereof may optionally be present at one or both of the fluoroelastomer polymer chain ends as a result of the use of chain transfer or molecular weight regulating agents during preparation of the fluoroelastomers. The amount of chain transfer agent, when employed, is calculated to result in an iodine or bromine level in the fluoroelastomer in the range of 0.005–5 wt. %, preferably 0.05–3 wt. %.

Examples of chain transfer agents include iodine-containing compounds that result in incorporation of bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,6-diiodoperfluorohexane; 1,3-diiodo-2-chloroperfluoropropane; 1,2-di(iododifluoromethyl)-perfluorocyclobutane; monoiodoperfluoroethane; monoiodoperfluorobutane; 2-iodo-1-hydroperfluoroethane, etc. Also included are the cyano-iodine chain transfer agents disclosed European Pat. 0868447A1. Particularly preferred are diiodinated chain transfer agents.

Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Other chain transfer agents suitable for use in the process of this invention include those disclosed in U.S. Pat. No. 3,707,529. Examples of such agents include isopropanol, diethylmalonate, ethyl acetate, carbon tetrachloride, acetone and dodecyl mercaptan.

Cure site monomers and chain transfer agents may be added to the reactor neat or as solutions. In addition to being introduced into the reactor near the beginning of polymerization, quantities of chain transfer agent may be added throughout the entire polymerization reaction period, depending upon the desired composition of the fluoroelastomer being produced, the chain transfer agent being employed, and the total reaction time.

A fluorosurfactant of the formula $F—(CF_2CF_2)_n—CH_2CH_2SO_3M$, where n is an integer from 2 to 9 and M is a cation having a valence of 1 (e.g. $H^+$, $Na^+$, $K^+$, $NH_4^+$, etc.), is employed as the dispersing agent in the polymerization process of this invention. The acid form (i.e. M is $H^+$) is the preferred surfactant because of its increased solubility in water. However, all of the forms work well in the polymerization of fluoroelastomers.

The dispersing agent may also be a mixture of fractions of any two or more surfactants of the above formula having n values from 2 to 9. In fact, most commercially available surfactants of the above formula are mixtures. Such a surfactant mixture is available commercially from DuPont as Zonyl® TBS fluorosurfactant which is an aqueous solution containing 33 wt. % surfactant (i.e. active ingredient, "A.I.") and 3 wt. % acetic acid.

Preferably n is 2 to 7 in the above formula, and most preferably n is 3. If n is less than 3, the surfactant may not form a stable emulsion and reactor fouling may occur. If n is greater than 3, excessive amounts of foam may be generated during the polymerization process and the surfactant may be difficult to wash out of the fluoroelastomer. The surfactant wherein n is predominantly 3 (i.e. when the major fraction of surfactant has the formula $CF_3CF_2CF_2CF_2CF_2CF_2CH_2CH_2SO_3M$), is commercially available from DuPont as Zonyl® FS-62 fluorosurfactant which is an aqueous solution of 25 wt. % surfactant (having a major amount of a fraction wherein n is 3 and minor amounts of fractions wherein n is 2, and 4–7) and 2 wt. % acetic acid. Another surfactant composition, wherein n is predominately 3, is available from Atofina as Forofac® 1033D.

The amount of surfactant to be employed in the aqueous emulsion polymerization solution is determined by balancing emulsion stability and polymerization rate with foam generation. If too little surfactant is used, excessive reactor fouling will occur and reaction rate may be undesirably slow. If too much surfactant is used, excessive foam will be generated. In an emulsion polymerization process of this invention, the amount of surfactant employed is typically 0.05 to 3 wt. %, based on the total weight of fluoroelastomer being produced. The type of monomer to be polymerized affects emulsion stability. For example, fluoroelastomers which contain copolymerized units of tetrafluoroethylene, propylene and vinylidene fluoride typically require 0.5 to 2 wt. % surfactant, whereas fluoroelastomers containing copolymerized units of vinylidene fluoride and hexafluoropropylene generally require only 0.1 to 0.3 wt. % surfactant. Surprisingly, manufacture of fluoroelastomers containing 35 wt. % or more vinylidene fluoride only requires 0.1 to 0.15 wt. % surfactant in order to produce a stable fluoroelastomer dispersion and the conversion rate is faster than one skilled in the art would expect from prior experience in manufacturing the same fluoroelastomers, but using C-8 as the surfactant. The preceding amounts are based on the amount of active ingredient, not on amount of a surfactant solution containing less that 100% active ingredient.

The emulsion polymerization process of this invention may be a continuous, semi-batch or batch process.

In the semi-batch emulsion polymerization process of this invention, a gaseous monomer mixture of a desired composition (initial monomer charge) is introduced into a reactor which contains an aqueous solution. The reactor is typically not completely filled with the aqueous solution, so that a vapor space remains. The aqueous solution comprises a fluorosurfactant dispersing agent of the type discussed above. Optionally, the aqueous solution may contain a pH buffer, such as a phosphate or acetate buffer for controlling the pH of the polymerization reaction. Instead of a buffer, a base, such as NaOH may be used to control pH. Generally, pH is controlled to between 1 and 7 (preferably 3–7), depending upon the type of fluoroelastomer being made. Alternatively, or additionally, pH buffer or base may be added to the reactor at various times throughout the polymerization reaction, either alone or in combination with other ingredients such as polymerization initiator, liquid cure site monomer or chain transfer agent. Also optionally, the initial aqueous solution may contain a water-soluble inorganic peroxide polymerization initiator.

The initial monomer charge contains a quantity of a first monomer of either TFE or $VF_2$ and one or more additional monomers which are different from the first monomer. The amount of monomer mixture contained in the initial charge is set so as to result in a reactor pressure between 0.5 and 10 MPa.

The monomer mixture is dispersed in the aqueous medium and, optionally, a chain transfer agent may also be added at this point while the reaction mixture is agitated, typically by mechanical stirring. In the initial gaseous monomer charge, the relative amount of each monomer is dictated by reaction kinetics and is set so as to result in a fluoroelastomer having the desired ratio of copolymerized monomer units (i.e. very slow reacting monomers must be present in a higher amount relative to the other monomers than is desired in the composition of the fluoroelastomer to be produced).

The temperature of the semi-batch reaction mixture is maintained in the range of 25° C.–130° C., preferably 50° C.–100° C. Polymerization begins when the initiator either thermally decomposes or reacts with reducing agent and the resulting radicals react with dispersed monomer.

Additional quantities of the gaseous major monomers and cure site monomer (incremental feed) are added at a controlled rate throughout the polymerization in order to maintain a constant reactor pressure at a controlled temperature. The relative ratio of monomers contained in the incremental feed is set to be approximately the same as the desired ratio of copolymerized monomer units in the resulting fluoroelastomer. Thus, the incremental feed contains between 25 to 70 weight percent, based on the total weight of the monomer mixture, of a first monomer of either TFE or $VF_2$ and 75 to 30 weight percent of one or more additional monomers that are different from the first monomer. Chain transfer agent may also, optionally, be introduced into the reactor at any point during this stage of the polymerization. Additional fluorosurfactant and polymerization initiator may also be fed to the reactor during this stage. The amount of polymer formed is approximately equal to the cumulative amount of incremental monomer feed. One skilled in the art will recognize that the molar ratio of monomers in the incremental feed is not necessarily exactly the same as that of the desired (i.e. selected) copolymerized monomer unit composition in the resulting fluoroelastomer because the composition of the initial charge may not be exactly that required for the selected final fluoroelastomer composition, or because a portion of the monomers in the incremental feed may dissolve into the polymer particles already formed, without reacting. Polymerization times in the range of from 2 to 30 hours are typically employed in this semi-batch polymerization process.

The continuous emulsion polymerization process of this invention differs from the semi-batch process in the following manner. The reactor is completely filled with aqueous solution so that there is no vapor space. Gaseous monomers and solutions of other ingredients such as watersoluble monomers, chain transfer agents, buffer, bases, polymerization initiator, surfactant, etc., are fed to the reactor in separate streams at a constant rate. Feed rates are controlled so that the average polymer residence time in the reactor is generally between 0.2 to 4 hours. Short residence times are employed for reactive monomers, whereas less reactive monomers such as perfluoro(alkyl vinyl) ethers require more time. The temperature of the continuous process reaction mixture is maintained in the range of 25° C.–130° C., preferably 80° C.–120° C.

In the process of this invention, the polymerization temperature is maintained in the range of 25° C.–130° C. If the temperature is below 25° C., the rate of polymerization is too slow for efficient reaction on a commercial scale, while if the temperature is above 130° C., the reactor pressure required in order to maintain polymerization is too high to be practical.

The polymerization pressure is controlled in the range of 0.5 to 10 MPa, preferably 1 to 6.2 MPa. In a semi-batch process, the desired polymerization pressure is initially achieved by adjusting the amount of gaseous monomers in the initial charge, and after the reaction is initiated, the pressure is adjusted by controlling the incremental gaseous monomer feed. In a continuous process, pressure is adjusted by means of a back-pressure regulator in the dispersion effluent line. The polymerization pressure is set in the above range because if it is below 1 MPa, the monomer concentration in the polymerization reaction system is too low to obtain a satisfactory reaction rate. In addition, the molecular weight does not increase sufficiently. If the pressure is above 10 MPa, the cost of the required high pressure equipment is very high.

The amount of fluoroelastomer copolymer formed is approximately equal to the amount of incremental feed charged, and is in the range of 10–30 parts by weight of copolymer per 100 parts by weight of aqueous medium, preferably in the range of 20–25 parts by weight of the copolymer. The degree of copolymer formation is set in the above range because if it is less than 10 parts by weight, productivity is undesirably low, while if it is above 30 parts by weight, the solids content becomes too high for satisfactory stirring.

Water-soluble peroxides which may be used to initiate polymerization in this invention include, for example, the ammonium, sodium or potassium salts of hydrogen persulfate. In a redox-type initiation, a reducing agent such as sodium sulfite, is present in addition to the peroxide. These water-soluble peroxides may be used alone or as a mixture of two or more types. The amount to be used is selected generally in the range of 0.01 to 0.4 parts by weight per 100 parts by weight of polymer, preferably 0.05 to 0.3. During polymerization some of the fluoroelastomer polymer chain ends are capped with fragments generated by the decomposition of these peroxides.

Optionally, fluoroelastomer gum or crumb may be isolated from the fluoroelastomer dispersions produced by the process of this invention by the addition of a coagulating agent to the dispersion. Any coagulating agent known in the art may be used. Preferably, a coagulating agent is chosen which forms a water-soluble salt with the surfactant contained in the dispersion. Otherwise, precipitated surfactant salt may become entrained in the isolated fluoroelastomer and then retard curing of the fluoroelastomer with bisphenol-type curatives.

In one isolation process, the fluoroelastomer dispersion is adjusted to a pH less than 4 and then coagulated by addition of an aluminum salt. Undesirable insoluble aluminum hydroxides form at pH values greater than 4. Aluminum salts useful as coagulating agents include, but are not limited to aluminum sulfate and alums of the general formula M'Al$(SO_4)_2 \cdot 12H_2O$, wherein M' is a univalent cation, except for lithium. The resulting coagulated fluoroelastomer may then be filtered, washed and dried. This isolation process is especially useful when the surfactant employed in the emulsion polymerization process contains a substantial amount of surfactant species having a long chain length (i.e. >4 carbon atoms) perfluoroalkyl group. In this case, other potential coagulants such as calcium or magnesium salts form insoluble salts with the surfactant, causing the surfactant to drop out of solution and become entrained in the fluoroelastomer. Special care must then be taken to wash most of the residual surfactant from the fluoroelastomer. Residual surfactant may adversely affect subsequent processing and properties of the fluoroelastomer.

In addition to aluminum salts, common coagulants such as calcium salts (e.g. calcium nitrate) or magnesium salts (e.g. magnesium sulfate), and some salts of univalent cations (e.g. sodium chloride or potassium chloride), may be readily used in order to coagulate fluoroelastomers which are produced in a process of this invention that employs a surfactant having a large fraction of species having a shorter chain length (i.e. 2–4 carbon atoms) perfluoroalkyl group. Salts of calcium, magnesium, or univalent cations with such short chain surfactants are water-soluble, and thus readily removable from the fluoroelastomer.

Another aspect of this invention is the curable fluoroelastomers that are produced by the process of this invention. Such fluoroelastomers are generally molded and then vulcanized during fabrication into finished products such as seals, wire coatings, hose, etc. Suitable vulcanization methods employ, for example, polyol, polyamine, organic peroxide, organotin, bis(aminophenol), tetraamine, or bis (thioaminophenol) compounds as curatives.

The fluoroelastomers prepared by the process of this invention are useful in many industrial applications including seals, wire coatings, tubing and laminates.

EXAMPLES

Test Methods

Mooney viscosity, ML (1+10), was determined according to ASTM D1646 with an L (large) type rotor at 121° C., using a preheating time of one minute and rotor operation time of 10 minutes.

The invention is further illustrated by, but is not limited to, the following examples.

Example 1

A $VF_2$/HFP fluoroelastomer was prepared by the continuous emulsion polymerization process of the invention in a well-stirred 4.0-liter stainless steel liquid full reaction vessel at 120° C. An aqueous solution, consisting of 4.39 g/hour (g/h) ammonium persulfate (initiator), 2.04 g/h sodium hydroxide (forms a pH buffer system with the acetic acid contained in the surfactant), 13.4 g/h Zonyl® FS-62 fluorosurfactant (25 wt. % active ingredient) solution, and 2.40 g/h isopropanol (chain transfer agent) in deionized water, was fed to the reactor at a rate of 10 L/hour. The reactor was maintained at a liquid-full level at a pressure of 6.2 MPa by means of a back-pressure control valve in the effluent line. After 30 minutes, polymerization was initiated by introduction of a gaseous monomer mixture consisting of 1542 g/h vinylidene fluoride ($VF_2$), and 1176 g/h hexafluoropropylene (HFP) fed through a diaphragm compressor. After 2.0 hours, collection of the resulting fluoroelastomer latex was begun and continued for 6 hours. The latex, which had a pH of 3.6 and contained 21.0 wt. % solids, was separated from residual monomers in a degassing vessel at atmospheric pressure. Fluoroelastomer crumb product was isolated using aluminum sulfate solution. The coagulated fluoroelastomer polymer was allowed to settle, supernatant serum was removed, and the polymer was washed by reslurrying in water three times before filtering. The wet crumb was dried in an air oven at approximately 50°–65° C. to a moisture content of less than 1 wt. %. About 7.93 kg of fluoroelastomer was recovered at an overall conversion of 94.4%. The product, containing 59.03 wt. % $VF_2$ units and 40.97 wt. % HFP units, was an amorphous elastomer having a glass transition temperature of −18° C., as determined by differential scanning calorimetry (DSC) (heating mode, 10° C./minute, inflection point of transition). Inherent viscosity of the elastomer was 0.78 dL/g, measured at 30° C. in methyl ethyl ketone, and Mooney viscosity, ML (1+10), was 48.

Comparative Example A

A $VF_2$/HFP fluoroelastomer was prepared by a continuous emulsion polymerization process of the prior art in a well-stirred 2.0-liter stainless steel liquid full reaction vessel at 120° C. An aqueous solution, consisting of 2.39 g/h ammonium persulfate, 5.50 g/h sodium phosphate dibasic heptahydrate (pH buffer), 3.60 g/h ammonium perfluorooctanoate (C-8 surfactant), and 1.55 g/h isopropanol in deionized water, was fed to the reactor at a rate of 6 L/hour. The reactor was maintained at a liquid-full level at a pressure of 6.2 MPa by means of a back-pressure control valve in the effluent line. After 30 minutes, polymerization was initiated by introduction of a gaseous monomer mixture consisting of 872 g/h vinylidene fluoride ($VF_2$), and 674 g/h hexafluoropropylene (HFP) fed through a diaphragm compressor. After 1.5 hours, collection of the resulting fluoroelastomer latex was begun and continued for 4 hours. The latex, which had a pH of 3.85 and contained 19.5 wt. % solids, was separated from residual monomers in a degassing vessel at atmospheric pressure. Fluoroelastomer crumb product was isolated using potassium aluminum sulfate solution. The coagulated fluoroelastomer polymer was allowed to settle, supernatant serum was removed, and the polymer was washed by reslurrying in water three times before filtering. The wet crumb was dried in an air oven at approximately 50°–65° C. to a moisture content of less than 1 wt. %. About 5 kg of fluoroelastomer was recovered at an overall conversion of 92.3%. The product, containing 59.3 wt. % $VF_2$ units and 40.7 wt. % HFP units, was an amorphous elastomer having a glass transition temperature of −18° C., as determined by DSC (heating mode, 10° C./minute, inflection point of transition). Inherent viscosity of the elastomer was 0.94 dL/g, measured at 30° C. in methyl ethyl ketone, and Mooney viscosity, ML (1+10), was 47.

Example 2

A $VF_2$/HFP/TFE fluoroelastomer polymer was prepared by a continuous emulsion polymerization process of the invention in a well-stirred 4.0-liter stainless steel liquid full reaction vessel at 115° C. An aqueous solution, consisting of 3.74 g/hour (g/h) ammonium persulfate, 2.33 g/h sodium hydroxide, 13.4 g/h Zonyl® FS-62 fluorosurfactant (25 wt. % A.I.) solution, and 2.4 g/h isopropanol in deionized water, was fed to the reactor at a rate of 10 L/hour. The reactor was maintained at a liquid-full level at a pressure of 6.2 MPa by means of a back-pressure control valve in the effluent line. After 30 minutes, polymerization was initiated by introduction of a gaseous monomer mixture consisting of 632 g/h tetrafluoroethylene (TFE), 1147 g/h vinylidene fluoride ($VF_2$), and 939 g/h hexafluoropropylene (HFP) fed through a diaphragm compressor. After 2.0 hours collection of the resulting fluoroelastomer latex was begun and continued for 6 hours. The latex, which had a pH of 4.57 and contained 20.4 wt. % solids, was separated from residual monomers in a degassing vessel at atmospheric pressure. Fluoroelastomer crumb product was isolated using aluminum sulfate solution. The coagulated fluoroelastomer polymer was allowed to settle, supernatant serum was removed, and the polymer was washed by reslurrying in water three times before filtering. The wet crumb was dried in an air oven at approximately 50°–65° C. to a moisture content of less than 1 wt. %. About 15.35 kg of fluoroelastomer was recovered at an overall conversion of 95.6%. The product, containing 24.28 wt. % TFE units, 43.70 wt. % $VF_2$ units, and 32.02 wt. % HFP units, was an amorphous elastomer having a glass transition temperature of −13° C., as determined by DSC (heating mode, 10° C./minute, inflection point of transition). Inherent viscosity of the elastomer was 0.72 dL/g, measured at 30° C. in methyl ethyl ketone, and Mooney viscosity, ML (1+10), was 62.

Comparative Example B

A $VF_2$/HFP/TFE fluoroelastomer was prepared by a continuous emulsion polymerization process of the prior art in a well-stirred 4.0-liter stainless steel liquid full reaction vessel at 115° C. An aqueous solution, consisting of 3.59 g/hour (g/h) ammonium persulfate, 8.30 g/h sodium phosphate dibasic heptahydrate, 7.20 g/h ammonium perfluorooctanoate, and 2.30 g/h isopropanol in deionized water, was fed to the reactor at a rate of 10 L/hour. The reactor was maintained at a liquid-full level at a pressure of 6.2 MPa by means of a back-pressure control valve in the effluent line. After 30 minutes, polymerization was initiated by introduction of a gaseous monomer mixture consisting of 584 g/h tetrafluoroethylene (TFE), 1103 g/h vinylidene fluoride ($VF_2$), and 921 g/h hexafluoropropylene (HFP) fed through a diaphragm compressor. After 2.0 hours, collection of the resulting fluoroelastomer latex was begun and continued for 6 hours. The latex, which had a pH of 3.5 and contained 19.3 wt. % solids, was separated from residual monomers in a degassing vessel at atmospheric pressure. Fluoroelastomer crumb product was isolated using aluminum sulfate solution. The coagulated fluoroelastomer polymer was allowed to settle, supernatant serum was removed, and the polymer was washed by reslurrying in water three times before filtering. The wet crumb was dried in an air oven at approximately 50°–65° C. to a moisture content of less than 1 wt. %. About 14 kg of fluoroelastomer was recovered at an overall conversion of 92.2%. The product, containing 24.0 wt. % TFE units, 44.3 wt. % $VF_2$ units, and 31.7 wt. % HFP units, was an amorphous elastomer having a glass transition temperature of −12° C., as determined by DSC (heating mode, 10° C./minute, inflection point of transition). Inherent viscosity of the elastomer was 0.79 dL/g, measured at 30° C. in methyl ethyl ketone, and Mooney viscosity, ML (1+10), was 64.

Example 3

A $VF_2$/PMVE/TFE/BTFB fluoroelastomer was prepared by a continuous emulsion polymerization of the invention in a well-stirred 4.0-liter stainless steel liquid full reaction vessel at 110° C. An aqueous solution, consisting of 10.32 g/hour (g/h) ammonium persulfate, 4.53 g/h sodium hydroxide, and 8.9 g/h Zonyl® FS-62 fluorosurfactant (25 wt. % A.I) solution in deionized water, was fed to the reactor at a rate of 10 L/hour. The reactor was maintained at a liquid-full level at a pressure of 6.2 MPa by means of a back-pressure control valve in the effluent line. After 30 minutes, polymerization was initiated by introduction of a gaseous monomer mixture consisting of 667 g/h tetrafluoroethylene (TFE), 872 g/h vinylidene fluoride ($VF_2$), and 1138 g/h perfluoro(methyl vinyl) ether (PMVE) fed through a diaphragm compressor. After 15 minutes more, 4-bromo-3,3,4,4-tetrafluorobutene-1 (BTFB) added at a rate of 40.0 g/h. After 2.0 hours, collection of the resulting fluoroelastomer latex was begun and continued for 6 hours. The latex, which had a pH of 3.87 and contained 20.7 wt. % solids, was separated from residual monomers in a degassing vessel at atmospheric pressure. Fluoroelastomer crumb product was isolated from the latex by reducing the pH to about 3 with dilute sulfuric and coagulating with aluminum sulfate solution. The coagulated fluoroelastomer polymer was allowed to settle, supernatant serum was removed, and the polymer was washed by reslurrying in water three times before filtering. The wet crumb was dried in an air oven at approximately 50°–65° C. to a moisture content of less than 1 wt. %. About 15 kg of fluoroelastomer was recovered at an overall conversion of 96.0%. The product, containing 25.3 wt. % TFE units, 33.1 wt. % $VF_2$ units, 40.0 wt. % PMVE units and 1.54 wt. % BTFB units, was an amorphous elastomer having a glass transition temperature of −22° C., as determined by DSC (heating mode, 10° C./minute, inflection point of transition). Inherent viscosity of the elastomer was 0.66 dL/g, measured at 30° C. in methyl ethyl ketone, and Mooney viscosity, ML (1+10), was 77.

Comparative Example C

A VF2/PMVE/TFE/BTFB fluoroelastomer was prepared generally according to the process of Example 3. It differed from the process of Example 3 in that 5.40 g/h ammonium perfluorooctanoate was used in place of 2.50 g/h perfluorohexylethyl sulfonic acid. The overall conversion was 92.61%. The resulting fluoroelastomer, containing 33.96 wt. % $VF_2$ units, 25.82 wt. % TFE units, 38.61 wt. % PMVE units and 1.6 wt. % BTFB units, was an amorphous elastomer having a glass transition temperature of −24° C., as determined by DSC (heating mode, 10° C./minute, inflection point of transition). Inherent viscosity of the elastomer was 0.57 dL/g, measured at 30° C. in methyl ethyl ketone, and Mooney viscosity, ML (1+10), was 61.

Example 4

A $VF_2$/PMVE/TFE/2-HPFP fluoroelastomer was prepared by a continuous emulsion polymerization process of the invention in a well-stirred 4.0-liter stainless steel liquid full reaction vessel at 110° C. An aqueous solution, consisting of 3.5 g/hour (g/h) ammonium persulfate, 2.0 g/h sodium hydroxide, 8.4 g/h Zonyl® FS-62 fluorosurfactant (25 wt. % A.I.) solution, and 2.4 g/h isopropanol in deionized water, was fed to the reactor at a rate of 8 L/hour. The reactor was maintained at a liquid-full level at a pressure of 6.2 MPa by means of a back-pressure control valve in the effluent line. After 30 minutes, polymerization was initiated by introduction of a gaseous monomer mixture consisting of 185 g/h tetrafluoroethylene (TFE), 1237 g/h vinylidene fluoride ($VF_2$), and 835 g/h perfluoro(methyl vinyl) ether (PMVE) fed through a diaphragm compressor. After 15 minutes more, 2-hydropentafluoropropylene (2-HPFP) was introduced into the remainder of the gaseous mixture and added at a rate of 68.5 g/h. After 2.0 hours, collection of the resulting fluoroelastomer latex was begun and continued for 6 hours. The latex, which had a pH of 5.23 and contained 22.6 wt. % solids, was separated from residual monomers in a degassing vessel at atmospheric pressure. Fluoroelastomer crumb product was isolated from the latex by reducing the pH to about 3 with dilute sulfuric and coagulating with aluminum sulfate solution. The coagulated fluoroelastomer polymer was allowed to settle, supernatant serum was removed, and the polymer was washed by reslurrying in water twice before filtering. The wet crumb was dried in an air oven at approximately 50°–65° C. to a moisture content of less than 1 wt. %. About 14 kg of fluoroelastomer was recovered at an overall conversion of 97.1%. The product, containing 8.2 wt. % TFE units, 54.1 wt. % $VF_2$ units, 35.9 wt. % PMVE units and 1.84 wt. % 2-HPFP units, was an amorphous elastomer having a glass transition temperature of −30° C., as determined by DSC (heating mode, 10° C./minute, inflection point of transition). Inherent viscosity of the elastomer was 0.89 dL/g, measured at 30° C. in methyl ethyl ketone, and Mooney viscosity, ML (1+10), was 53.

Comparative Example D

A $VF_2$/PMVE/TFE/2-HPFP fluoroelastomer was prepared by a continuous emulsion polymerization process of the prior art generally according to the process of Example 4. It differed from the process of Example 4 in that 4.51 g/h ammonium perfluorooctanoate was used in place of 2.50 g/h perfluorohexylethyl sulfonic acid as surfactant. The overall conversion was 96.6%. The fluoroelastomer product, containing 54.31 wt. % $VF_2$ units, 8.22 wt. % TFE units, 35.80 wt. % PMVE units and 1.67 wt. % 2-HPFP units, was an amorphous elastomer having a glass transition temperature of −28° C., as determined by DSC (heating mode, 10° C./minute, inflection point of transition). Inherent viscosity of the elastomer was 0.87 dL/g, measured at 30° C. in methyl ethyl ketone, and Mooney viscosity, ML (1+10), was 53.

Example 5

A TFE/$PNF_2$ fluoroelastomer was prepared by a semi-batch emulsion polymerization of the invention in a well-stirred reaction vessel at 60° C. A 33-liter, horizontally agitated reactor was charged with 20 liters of deionized, deoxygenated water, 548 g Zonyl® FS-62 fluorosurfactant (25 wt. % A.I.) solution and 15 g of sodium hydroxide. The reactor was heated to 60° C. and then pressurized to 2.07 MPa with a mixture of 75.0 wt. % TFE, 20.0 wt. % $VF_2$, and 5.0 wt. % propylene (P). A 250 ml aliquot of a 10 wt. % ammonium persulfate/2.5 wt. % sodium hydroxide initiator solution was then added. A mixture of 70.0 wt. % TFE, 10.0 wt. % $VF_2$, and 20.0 wt. % propylene was charged to the reactor to maintain a pressure of 2.07 MPa throughout the polymerization. The initiator solution was fed continuously at 5 ml/hour through the end of reaction. After a total of 8920 g monomer mixture had been supplied to the reactor, monomer addition was discontinued and the reactor was purged of residual monomer. The total reaction time was 23 hours. The resulting fluoroelastomer latex was coagulated by addition of aluminum sulfate solution and the fluoroelastomer crumb washed with deionized water. The crumb was dried for two days at 60° C. The fluoroelastomer product, containing 68 wt. % TFE units, 16 wt. % $VF_2$ units and 16 wt. % P units, was an amorphous elastomer having a glass transition temperature of −1° C., as determined by DSC (heating mode, 10° C./minute, inflection point of transition). Mooney viscosity, ML(1+10), was 37.

Comparative Example E

A TFE/$PNF_2$ fluoroelastomer was prepared by a semi-batch emulsion polymerization of the prior art in a well-stirred reaction vessel at 60° C. A 33-liter, horizontally agitated reactor was charged with 20 liters of deionized, deoxygenated water, 300 g ammonium perfluorooctanoate and 90 g sodium phosphate dibasic heptahydrate. The reactor was heated to 60° C. and then pressurized to 2.07 MPa with a mixture of 75.0 wt. % TFE, 20.0 wt. % $VF_2$, and 5.0 wt. % propylene (P). A 250 ml aliquot of a 10% ammonium persulfate initiator solution was then added. A mixture of 70.0% wt. % TFE, 10.0 wt. % $VF_2$, and 20.0 wt. % propylene was fed to the reactor to maintain a pressure of 2.07 MPa throughout the polymerization. The initiator solution was fed continuously at 5 ml/hour through the end of reaction. After a total of 8980 g monomer mixture had been supplied to the reactor, monomer addition was discontinued and the reactor was purged of residual monomer. The total reaction time was 29 hours. The resulting fluoroelastomer latex was coagulated by addition of aluminum sulfate solution and the fluoroelastomer crumb washed with deionized water. The crumb was dried for two days at 60° C.

Example 6

A $VF_2$/HFP/TFE fluoroelastomer having iodine end groups was prepared by a semi-batch emulsion polymerization process of the invention as follows. A 40 liter reactor was charged with a solution of 229.6 grams of Zonyl® FS-62 fluorosurfactant (25 wt. % A.I.), 20.6 grams 10% ammonia solution, and 24,922 grams deionized, deoxygenated water. The reactor was heated to 80° C., agitated, and pressurized with 1030 grams of a mixture of 43.5 mol % vinylidene fluoride, 54.3 mol % hexafluoropropene, and 2.2 mol % tetrafluoroethylene. At the end of pressurization, the reactor pressure was 1.48 MPa. 40.0 grams of a solution of 1% ammonium persulfate and 5% disodium phosphate heptahydrate was added to the reactor to commence polymerization. As the reactor pressure dropped, a mixture of 66.2 mol % vinylidene fluoride, 16.9 mol % hexafluoropropene, and 16.9 mol % tetrafluoroethylene was fed to the reactor to maintain a 1.48 MPa pressure. Additional initiator was fed to the reactor to continue the polymerization. After 10.0 additional grams of the 1% ammonium persulfate/5% disodium phosphate heptahydrate solution had been added, corresponding to the consumption of 90 grams of monomer, 14.5 milliliters of a mixture of 49.3 mol % 1,4-diiodoperfluorobutane, 34.8 mol % 1,6-diiodoperfluorohexane, 12.6 mol % 1,8-diiodoperfluorooctane, and 3.3 mol % 1,10-diiodoperfluorodecane was charged to the reactor. After 136 total grams of the 1% ammonium persulfate/5% disodium phosphate heptahydrate solution had been added, corresponding to the consumption of 8,333 grams of monomer and 19.1 hours, monomer feed to the reactor was halted and the pressure in the reactor reduced to atmospheric. The resulting fluoroelastomer latex was coagulated with 200 grams of 2% aluminum sulfate solution, washed with deionized water, and dried at 70° C. for two days. The fluoroelastomer had a composition of 66.3/17.0/16.7 mole percent vinylidene fluoride/hexafluoropropylene/tetrafluoroethylene, a glass transition temperature of −17.9° C. (DSC inflection point), and a Mooney viscosity, ML (1+10), of 58.

The above fluoroelastomer was compounded in a Banbury mixer with 3 phr MgO, 6 phr Ca(OH)$_2$, 1.9 phr VC-50 (a mixture of bisphenol AF curative and an accelerator, available from DuPont Dow Elastomers) and 30 phr MT carbon black. The resulting composition was molded into slabs and cured at 177° C. for 10 minutes, and post cured at 232° C. for 16 hours. Physical properties of the cured slabs were measured according to ASTM D412: $M_{100}$ was 636 psi (4.39 MPa), tensile strength was 1758 psi (12.12 MPa), elongation at break was 271% and Hardness (Shore A) was 72.

Example 7

A VF$_2$/PMVE/TFE fluoroelastomer having iodine end groups was prepared by a semi-batch emulsion polymerization process of the invention as follows. A 40 liter reactor was charged with a solution of 229.6 grams of Zonyl FS-62 fluorosurfactant (25 wt. % A.I.), 20.6 grams 10% ammonia solution, and 24,922 grams deionized, deoxygenated water. The reactor was heated to 80° C., agitated, and pressurized with 1100 grams of a mixture of 67.0 mol % vinylidene fluoride, 29.9 mol % perfluoro(methyl vinyl) ether, and 3.1 mol % tetrafluoroethylene. At the end of pressurization, the reactor pressure was 1.83 MPa. 35.0 grams of a solution of 1% ammonium persulfate and 5% disodium phosphate heptahydrate was added to the reactor to commence polymerization. As the reactor pressure dropped, a mixture of 73.0 mol % vinylidene fluoride, 18.2 mol % perfluoro(methyl vinyl) ether, and 8.8 mol % tetrafluoroethylene was fed to the reactor to maintain a 1.83 MPa pressure. Additional initiator was fed to the reactor to continue the polymerization. After 40.0 additional grams of the 1% ammonium persulfate/5% disodium phosphate heptahydrate solution had been added, corresponding to the consumption of 90 grams of monomer, 17.0 milliliters of a mixture of 49.3 mol % 1,4-diiodoperfluorobutane, 34.8 mol % 1,6-diiodoperfluorohexane, 12.6 mol % 1,8-diiodoperfluorooctane, and 3.3 mol % 1,10-diiodoperfluorodecane was charged to the reactor. After 108 total grams of the 1% ammonium persulfate/5% disodium phosphate heptahydrate solution had been added, corresponding to the consumption of 8,333 grams of monomer and 20.6 hours, monomer feed to the reactor was halted and the pressure in the reactor reduced to atmospheric. The resulting fluoroelastomer latex was coagulated with 200 grams of 2% aluminum sulfate solution. The fluoroelastomer crumb was washed with deionized water, and dried at 70° C. for two days. The resulting fluoroelastomer had a composition of 75.5/17.9/6.6 mole percent vinylidene fluoride/perfluoro(methyl vinyl) ether/tetrafluoroethylene, a glass transition temperature of −31.9° C. (DSC inflection point), and a Mooney viscosity, ML (1+10), of 41.

Example 8

A 40 liter reactor was charged with a solution of 125.0 grams Forafac® 1033D (a 30% solution of perfluorohexylethylsulfonic acid available from Atofina), 27.7 grams of disodium phosphate heptahydrate, and 24,847.3 grams deionized, deoxygenated water. The reactor was heated to 80° C., agitated, and pressurized with 2260 grams of a gaseous mixture of 39.3 mol % tetrafluoroethylene and 60.7 mol % perfluoro(methyl vinyl) ether. At the end of pressurization, the reactor pressure was 2.17 MPa. 40.0 grams of a solution of 1% ammonium persulfate and 5% disodium phosphate heptahydrate was added to the reactor to commence polymerization. As the reactor pressure dropped, a mixture of 64.2 mol % tetrafluoroethylene and 35.8 mol % perfluoro(methyl vinyl) ether was fed to the reactor to maintain a 2.17 MPa pressure. Additional initiator was fed to the reactor to continue the polymerization. After 90.0 grams of monomer had been charged to the reactor, 14.5 milliliters of a mixture of 49.3 mol % 1,4-diiodoperfluorobutane, 34.8 mol % 1,6-diiodoperfluorohexane, 12.6 mol % 1,8-diiodoperfluorooctane, and 3.3 mol % 1,10-diiodoperfluorodecane was charged to the reactor. After 67 total grams of the 1% ammonium persulfate/5% disodium phosphate heptahydrate solution had been added, corresponding to the consumption of 8,333 grams of monomer and an elapsed time of 17.0 hours, monomer feed to the reactor was halted and the pressure in the reactor reduced to atmospheric. The resulting latex was acidified to pH 2.3 with sulfuric acid, and then coagulated with 250 grams of 2% aluminum sulfate solution, washed with deionized water, and then dried at 70° C. for two days. The resulting polymer had a composition of 67.3/32.7 mol fraction copolymerized units of tetrafluoroethylene/perfluoro(methyl vinyl) ether, a glass transition temperature of 0.8° C. (DSC inflection point), and a Mooney viscosity, ML (1+10), of 39.

Example 9

A VF$_2$/HFP polymer of the invention was prepared by continuous emulsion polymerization, carried out at 120° C. in a well-stirred 4.0-liter stainless steel liquid full reaction vessel. An aqueous solution, consisting of 4.4 g/hour (g/h) ammonium persulfate, 12.8 g/h sodium phosphate dibasic heptahydrate, 3.0 g/h active ingredient Forafac 1033D fluorosurfactant (available from Atofina), and 2.4 g/h isopropanol in deionized water, was fed to the reactor at a rate of 10 L/hour. The reactor was maintained at a liquid-full level at a pressure of 6.2 MPa by means of a back-pressure control valve in the effluent line. After 30 minutes, polymerization was initiated by introduction of a gaseous monomer mixture consisting of 1538 g/h vinylidene fluoride (VF$_2$), and 1150 g/h hexafluoropropylene (HFP) fed through a diaphragm compressor. After 2.0 hours, effluent dispersion was collected for 6 hours. The effluent polymer dispersion, which had a pH of 4.0 and contained 20.2 wt. % solids, was separated from residual monomers in a degassing vessel at atmospheric pressure. Fluoroelastomer product was isolated using potassium aluminum sulfate solution. The coagulated polymer was allowed to settle; supernatant serum was removed, and the polymer was washed by reslurrying in water three times before filtering. The wet crumb was dried in an air oven at approximately 50°–65° C. to a moisture content of less than 1%. About 15 kg of polymer was recovered at an overall conversion of 94.1%. The product, comprised of 59.58 wt. % $VF_2$ units and 40.42 wt. % HFP units, was an amorphous elastomer having a glass transition temperature of −17° C., as determined by differential scanning calorimetry (heating mode, 10° C./minute, inflection point of transition). Inherent viscosity of the elastomer was 0.82 dL/g, measured at 30° C. in methyl ethyl ketone, and Mooney viscosity, ML (1+10), was 51.

What is claimed is:

1. An emulsion polymerization process for producing a fluoroelastomer comprising:
   (A) charging a reactor with a quantity of an aqueous solution comprising a surfactant of the formula $F-(CF_2CF_2)_n-CH_2CH_2SO_3M$ where n is an integer from 3 to 9, or mixtures thereof, and M is a cation having a valence of 1;
   (B) charging the reactor with a quantity of a monomer mixture to form a reaction medium, said monomer mixture comprising i) from 25 to 70 weight percent, based on total weight of the monomer mixture, of a first monomer, said first monomer selected from the group consisting of vinylidene fluoride and tetrafluoroethylene, and ii) between 75 and 30 weight percent, based on total weight of the monomer mixture, of one or more additional copolymerizable monomers, different from said first monomer, wherein said additional monomer is selected from the group consisting of fluorine-containing olefins, fluorine-containing vinyl ethers, hydrocarbon olefins and mixtures thereof;
   (C) polymerizing said monomers in the presence of a free radical initiator to form a fluoroelastomer dispersion while maintaining said reaction medium at a pH between 1 and 7, at a pressure between 0.5 and 10 MPa, and at a temperature between 25° C. and 130° C. and
   (D) isolating fluoroelastomer from said dispersion by addition of a coagulating agent selected from the group consisting of aluminum sulfate and alum.

2. The emulsion polymerization process of claim 1 wherein said surfactant is predominantly of the formula $CF_3CF_2CF_2CF_2CF_2CF_2CH_2CH_2SO_3M$, wherein M is a cation having a valence of 1.

3. The emulsion polymerization process of claim 1 wherein said first monomer is vinylidene fluoride.

4. The emulsion polymerization process of claim 1 wherein said first monomer is tetrafluoroethylene.

5. The emulsion polymerization process of claim 1 wherein at least one additional monomer is a fluorine-containing olefin.

6. The emulsion polymerization process of claim 5 wherein said fluorine-containing olefin is selected from the group consisting of vinylidene fluoride; tetrafluoroethylene; hexafluoropropylene; 1,2,3,3,3-pentafluoropropene; and chlorotrifluoroethylene.

7. The emulsion polymerization process of claim 1 wherein at least one additional monomer is a fluorine-containing vinyl ether.

8. The emulsion polymerization process of claim 7 wherein said fluorine-containing vinyl ether is a perfluoro (alkyl vinyl) ether.

9. The emulsion polymerization process of claim 8 wherein said perfluoro(alkyl vinyl) ether is perfluoro(methyl vinyl) ether.

10. The emulsion polymerization process of claim 1 wherein at least one additional monomer is a hydrocarbon olefin selected from the group consisting of propylene and ethylene.

11. The emulsion polymerization process of claim 1 wherein said monomer mixture further comprises 0.05 to 10 weight percent, based on the total weight of monomers, of a cure site monomer.

12. The emulsion polymerization process of claim 11 wherein said cure site monomer is selected from the group consisting of i) bromine-containing olefins; ii) iodine-containing olefins; iii) bromine-containing vinyl ethers; iv) iodine-containing vinyl ethers; v) fluorine-containing olefins having a nitrile group; vi) fluorine-containing vinyl ethers having a nitrile group; vii) 1,1,3,3,3-pentafluoropropefle; viii) perfluoro(2-phenoxypropyl vinyl) ether; and non-conjugated dienes.

13. The emulsion polymerization process of claim 1 wherein a chain transfer agent is added to said reaction medium during step (C).

14. The emulsion polymerization process of claim 1 wherein said fluoroelastomer comprises copolymerized units selected from the group consisting of i) vinylidene fluoride and hexafluoropropylene; ii) vinylidene fluoride, hexafluoropropylene and tetrafluoroethylene; iii) vinylidene fluoride, hexafluoropropylene, tetrafluoroethylene and 4-bromo-3,3,4,4-tetrafluorobutene-1; iv) vinylidene fluoride, hexafluoropropylene, tetrafluoroethylene and 4-iodo-3,3,4,4-tetrafluorobutelle-l; v) vinylidene fluoride, perfluoro(methyl vinyl) ether, tetrafluoroethylene and 4-bromo-3,3,4,4-tetrafluorobutefle-1; vi) vinylidene fluoride, perfluoro(methyl vinyl) ether, tetrafluoroethylene and 4-iodo-3,3,4,4-tetrafluoroethylene-1; vii) vinylidene fluoride, perfluoro(methyl vinyl) ether, tetrafluoroethylene and 1,1,3,3,3-pentafluoropropene; viii) tetrafluoroethylene, perfluoro(methyl vinyl) ether and ethylene; ix) tetrafluoroethylene, perfluoro(methyl vinyl) ether, ethylene and 4-bromo-3,3,4,4-tetrafluorobutene-1; x) tetrafluoroethylene, perfluoro(methyl vinyl) ether, ethylene and 4-iodo-3,3,4,4-tetrafluorobutene-1; xi) tetrafluoroethylene, propylene and vinylidene fluoride; xii) tetrafluoroethylene and perfluoro(methyl vinyl) ether; xiii) tetrafluoroethylene, perfluoro(methyl vinyl) ether and perfluoro(8-cyano-5-methyl-3,6-dioxa-1 -octene); xiv) tetrafluoroethylene, perfluoro(methyl vinyl) ether and 4-bromo-3,3,4,4-tetrafluorobutene-1; xv) tetrafluoroethylene, perfluoro(methyl vinyl) ether and 4-iodo-3,3,4,4-tetrafluorobutene-1; and xvi) tetrafluoroethylene, perfluoro(methyl vinyl) ether and perfluoro(2-phenoxypropyl vinyl) ether.

15. The emulsion polymerization process of claim 14 wherein said fluoroelastomer further comprises end groups selected from the group consisting of bromine-containing end groups, iodine-containing end groups, and mixtures thereof.

16. A curable fluoroelastomer prepared by the process of claim 1.

* * * * *